United States Patent
Shinohara et al.

(10) Patent No.: US 12,075,285 B2
(45) Date of Patent: Aug. 27, 2024

(54) WIRELESS COMMUNICATION SYSTEM, AND WIRELESS COMMUNICATION METHOD

(71) Applicant: NIPPON TELEGRAPH AND TELEPHONE CORPORATION, Tokyo (JP)

(72) Inventors: Shoko Shinohara, Musashino (JP); Yasuhiko Inoue, Musashino (JP); Takafumi Hayashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 427 days.

(21) Appl. No.: 17/435,322

(22) PCT Filed: Feb. 25, 2020

(86) PCT No.: PCT/JP2020/007472
§ 371 (c)(1),
(2) Date: Aug. 31, 2021

(87) PCT Pub. No.: WO2020/179542
PCT Pub. Date: Sep. 10, 2020

(65) Prior Publication Data
US 2022/0141712 A1    May 5, 2022

(30) Foreign Application Priority Data
Mar. 4, 2019 (JP) ................................. 2019-039043

(51) Int. Cl.
*H04W 28/18* (2009.01)
*H04B 7/0426* (2017.01)
(Continued)

(52) U.S. Cl.
CPC ............ *H04W 28/18* (2013.01); *H04B 7/043* (2013.01); *H04B 7/088* (2013.01); *H04W 4/06* (2013.01); *H04W 16/28* (2013.01)

(58) Field of Classification Search
CPC ....... H04W 28/18; H04W 4/06; H04W 16/28; H04B 7/043; H04B 7/088
See application file for complete search history.

(56) References Cited

U.S. PATENT DOCUMENTS

| | | | |
|---|---|---|---|
| 2009/0219849 A1* | 9/2009 | Alpert | H04W 76/40 |
| | | | 370/312 |
| 2016/0381514 A1* | 12/2016 | Åkesson | H04W 72/30 |
| | | | 370/312 |
| 2017/0374633 A1* | 12/2017 | Li | H04W 56/001 |

FOREIGN PATENT DOCUMENTS

JP    2018517378 A    6/2018

OTHER PUBLICATIONS

Part 11: Wireless LAN Medium Access Control (MAC) and Physical Layer (PHY) Specifications, IEEE Std 802. Nov. 2016 IEEE Standard for Information technology—Telecommunications and information exchange between systems Local and metropolitan area networks-Specific requirements, Dec. 2016.

* cited by examiner

*Primary Examiner* — Won Tae C Kim
(74) *Attorney, Agent, or Firm* — Harness, Dickey & Pierce, P.L.C.

(57) ABSTRACT

Provided is a wireless communication system that includes a transmission device configured to receives an input of group-addressed data transmitted from a specific source, convert the group-addressed data into wireless frames, and perform group-addressed transmission of the wireless frames; and a reception device configured to receive the wireless frames transmitted from the transmission device, (Continued)

and identify and receive the group-addressed data of the specific source, wherein a plurality of the transmission devices are provided, and each of the transmission devices is configured to perform group-addressed transmission of the wireless frames into which the group-addressed data is converted, and the reception device is configured to identify and receive the group-addressed data of the specific source from the wireless frames transmitted from the plurality of transmission devices, and perform diversity combining processing of combining the same pieces of group-addressed data.

5 Claims, 9 Drawing Sheets

(51) Int. Cl.
    *H04B 7/08*       (2006.01)
    *H04W 4/06*       (2009.01)
    *H04W 16/28*     (2009.01)

WIRELESS COMMUNICATION SYSTEM, AND WIRELESS COMMUNICATION METHOD

CROSS-REFERENCE TO RELATED APPLICATIONS

This application is a 371 U.S. National Phase of International Application No. PCT/JP2020/007472 filed on Feb. 25, 2020, which claims priority to Japanese Application No. 2019-039043 filed on Mar. 4, 2019. The entire disclosures of the above applications are incorporated herein by reference.

TECHNICAL FIELD

The present invention relates to a wireless communication system and a wireless communication method that perform a group addressed service using broadcast communication or multicast communication.

BACKGROUND ART

A wireless LAN system conforming to the IEEE 802.11 standard (NPL 1) is an example of a currently most popular wireless communication system that performs autonomous distributed access control.

Typically, group addressed services include broadcast services and multicast services. In IEEE 802.11 wireless LAN systems, handling of data with a group address, that is, data whose destination is a plurality of terminals is defined. In the IEEE 802.11 standard, "10.3.6 Group addressed MPDU transfer procedure" defines a rule regarding a basic procedure of transferring group-addressed data, and "11.2 Power management" defines a rule regarding a data forwarding procedure when a terminal device is operating in a power save mode.

FIG. 8 shows a data forwarding procedure of typical unicast data transmission in the IEEE 802.11 standard. "AP" transmits unicast data in accordance with an access control procedure, and "STA" returns an ACK upon correctly receiving the unicast data.

FIG. 9 shows a procedure for transmitting group-addressed data (broadcast data/multicast data) in the IEEE 802.11 standard. "AP" transmits the group-addressed data in accordance with an access control procedure similar to that when transmitting unicast data. However, "STAs" do not return an ACK even upon correctly receiving the group-addressed data. This is because due to a plurality of destinations being present in group-addressed data transmission, a collision may occur if the respective "STAs" return ACKs. Accordingly, the broadcast/multicast communication does not include a procedure of returning a response after the transmission of data, and thus has low communication quality and reliability as compared to unicast communication.

CITATION LIST

Non Patent Literature

[NPL 1] IEEE Std 802.11-2016

SUMMARY OF THE INVENTION

Technical Problem

If group addressed communication (broadcast/multicast communication) is performed only unidirectionally, no response frame is transmitted from a communication partner, which serves as a destination, in contrast to a case where bi-directional communication is performed, and thus it is not possible to acquire feedback information regarding whether or not the communication was successful, regarding the current communication quality, or the like. Accordingly, there are currently problems that even when wireless frames are transmitted, frame errors frequently occur and content cannot be received correctly due to a poor communication environment such as a propagation path, or a low speed rate is used more than necessary in order to inversely reduce the frame error rate, causing a reduction in the capacity.

An object of the present invention is to provide a wireless communication system and a wireless communication method that can increase, in group addressed communication, the communication quality and reliability even in unidirectional communication.

Means for Solving the Problem

A first invention relates to a wireless communication system including: a transmission device configured to receive an input of group-addressed data transmitted from a specific source, converts the group-addressed data into wireless frames, and perform group-addressed transmission of the wireless frames; and a reception device configured to receive the wireless frames transmitted from the transmission device, and identify and receive the group-addressed data of the specific source, wherein a plurality of the transmission devices are provided, and each of the transmission devices includes group-addressed transmission means for performing group-addressed transmission of the wireless frames into which the group-addressed data is converted, and the reception device includes combining processing means for identifying and receiving the group-addressed data of the specific source from the wireless frames transmitted from the plurality of transmission devices, and performing diversity combining processing of combining the same pieces of group-addressed data.

In the wireless communication system according to the first invention, the group-addressed transmission means may be configured to add, to the wireless frames to be subjected to the group-addressed transmission by the corresponding transmission device, a predetermined identifier unique to each piece of group-addressed data transmitted from the specific source, and the combining processing means may be configured to use the identifier to identify the group-addressed data of the specific source. Also, the predetermined identifier may include an identifier that indicates the specific source, and an identifier that indicates each of flows transmitted from the specific source.

In the wireless communication system according to the first invention, the group-addressed transmission means may be configured to set a higher MCS (modulation and coding scheme) with which the transmission device performs transmission the larger the number of transmission devices whose transmissions can be received by reception devices located within a cover area of that transmission device is.

A second invention relates to a wireless communication method in which a transmission device receives an input of group-addressed data transmitted from a specific source, converts the group-addressed data into wireless frames, and performs group-addressed transmission of the wireless frames, and a reception device receives the wireless frames transmitted from the transmission device, and identifies and receives the group-addressed data of the specific source, wherein a plurality of the transmission devices are provided, and each of the transmission devices executes a group-addressed transmission step of performing group-addressed transmission of the wireless frames into which the group-addressed data is converted, and the reception device executes a combining processing step of identifying and receiving the group-addressed data of the specific source from the wireless frames transmitted from the plurality of transmission devices, and performing diversity combining processing of combining the same pieces of group-addressed data.

In the wireless communication method according to the second invention, in the group-addressed transmission step, processing may be performed for adding, to the wireless frames to be subjected to the group-addressed transmission by the corresponding transmission device, a predetermined identifier unique to each piece of group-addressed data transmitted from the specific source, and in the combining processing step, the identifier may be used to identify the group-addressed data of the specific source. Also, the predetermined identifier may include an identifier that indicates the specific source, and an identifier that includes each of flows transmitted from the specific source.

In the wireless communication method according to the second invention, in the group-addressed transmission step, processing may be performed for setting a higher MCS (modulation and coding scheme) with which the transmission device performs transmission the larger the number of transmission devices whose transmissions can be received by reception devices located within a cover area of that transmission device is.

Effects of the Invention

According to the present invention, a plurality of transmission devices perform group-addressed transmission of group-addressed data from a specific source, and a reception device performs combining processing if the same pieces of group-addressed data of the specific source are received from the plurality of transmission devices, thereby making it possible to increase the communication quality of the received data.

DESCRIPTION OF EMBODIMENTS

Embodiment 1

Figure 1:
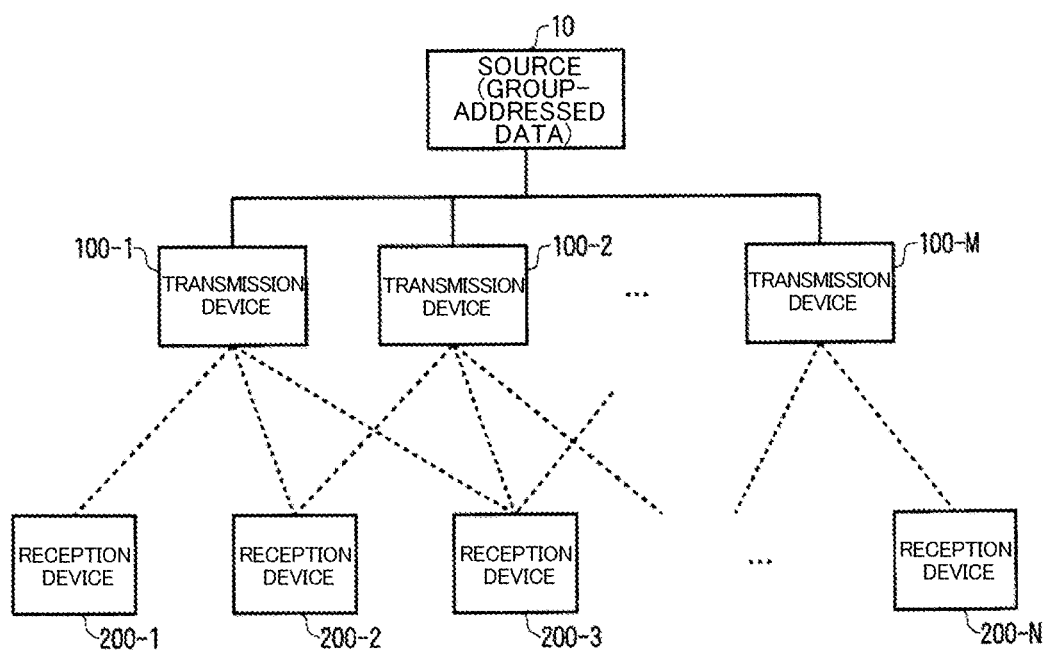
FIG. 1 is a diagram illustrating a configuration of Embodiment 1 of a wireless communication system of the present invention.

FIG. 1 shows a configuration of Embodiment 1 of a wireless communication system of the present invention.

In FIG. 1, upon input of group-addressed data transmitted from a specific source 10 such as a content server for example, a plurality of transmission devices 100-1 to 100-M each convert the group-addressed data into wireless frames and perform group addressed transmission of the converted wireless frames toward reception devices 200-1 to 200-N, and reception devices designated by each group address receive the converted wireless frames. Note that the plurality of transmission devices 100-1 to 100-M transmit the group-addressed data in the order from the transmission device that has just acquired a transmission right in accordance with an access control procedure. Each of the reception devices designated by the group address receives the same pieces of group-addressed data sequentially from the plurality of transmission devices.

Figure 2:
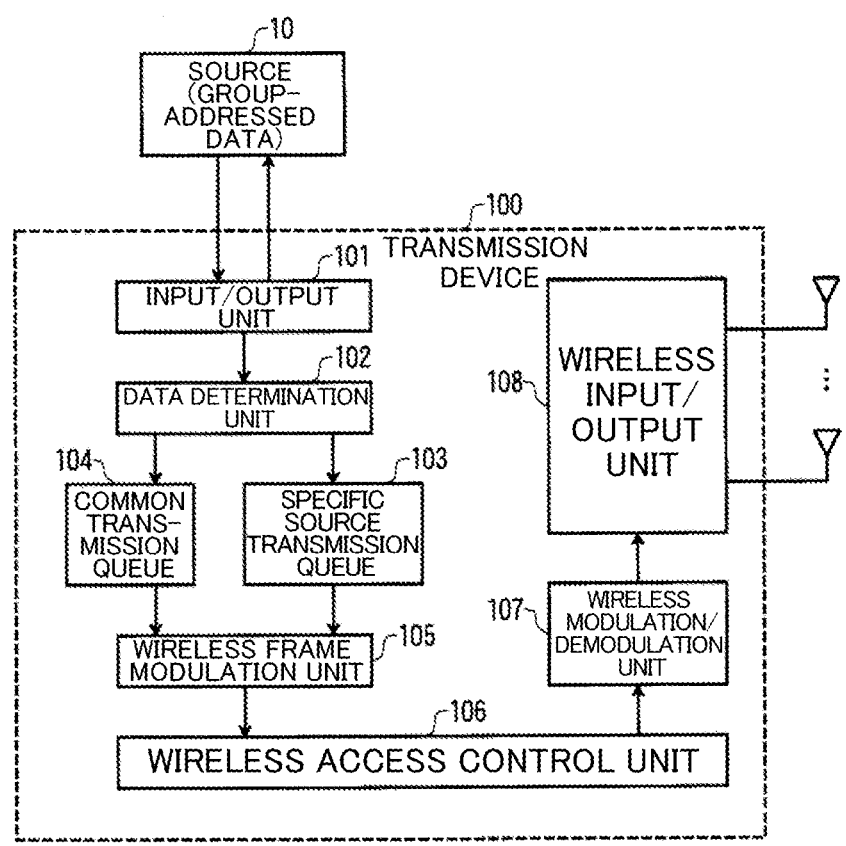
FIG. 2 is a diagram illustrating a configuration of Embodiment 1 of a transmission device 100.

FIG. 2 shows a configuration of Embodiment 1 of the transmission device 100.

In FIG. 2, an input/output unit 101 of the transmission device 100 outputs data forwarded from the upstream device to a data determination unit 102. The data determination unit 102 determines the input data, and if the input data is the group-addressed data transmitted from the specific source 10, the data determination unit 102 outputs the input data to a specific source transmission queue 103, but otherwise outputs the input data to a common transmission queue 104. Note that if the transmission device 100 always receives only group-addressed data from the specific source 10 (for example, if the transmission device 100 is a transmission device for exclusive use in broadcast), the data determination unit 102 and the common transmission queue 104 are unnecessary. A source ID that indicates the specific source 10 is added to the group-addressed data. For example, the source ID is stored in a source address (Address 3 in FIG. 7) of a wireless frame in which the group-addressed data is stored.

A wireless frame modulation unit 105 modulates the group-addressed data stored in the specific source transmission queue 103 according to a wireless frame format. A wireless access control unit 106 extracts, upon acquiring the transmission right through an accessing procedure that corresponds to each queue using CSMA/CA or the like, the data stored in the corresponding queue and transmits the extracted data as wireless frames via a wireless modulation/demodulation unit 107 and a wireless input/output unit 108.

Figure 3:
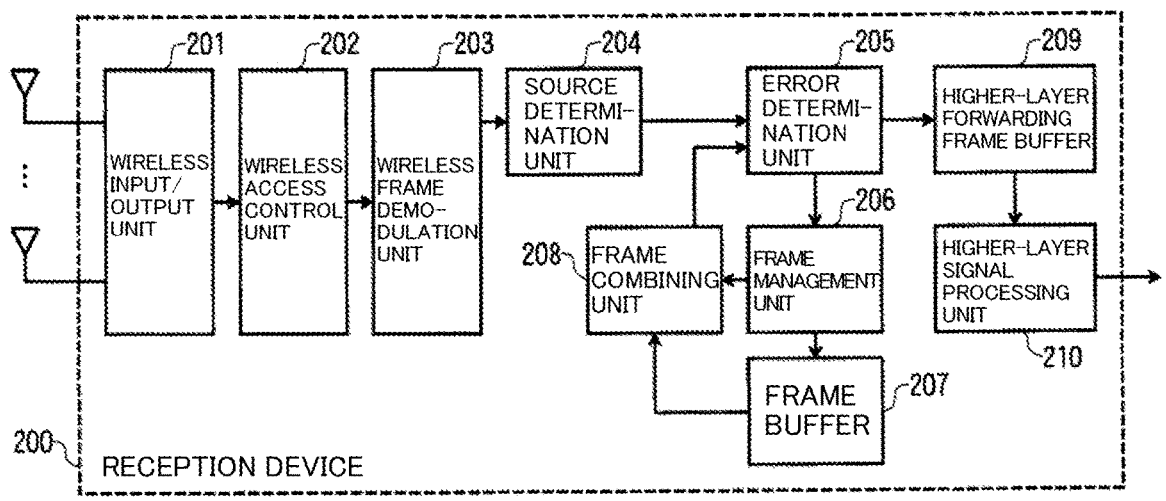
FIG. 3 is a diagram illustrating an example of a configuration of a reception device 200.

FIG. 3 shows an example of a configuration of the reception device 200.

In FIG. 3, a wireless input/output unit 201 of the reception device 200 receives a wireless frame, and a wireless access control unit 202 determines whether or not to start reception processing. Note that the wireless access control unit 202 has, in addition thereto, functions such as sensing a carrier in an unlicensed band, and the like, but such functions are not directly relevant to the present invention itself and thus details thereof are omitted.

A wireless frame demodulation unit 203 demodulates the received wireless frame and outputs the demodulated wireless frame to a source determination unit 204. Based on the source ID of header information or Frame Body information of the demodulated data frame, the source determination unit 204 determines whether or not this data frame is a group-addressed frame from the specific source. If this data frame is not a group-addressed frame from the specific source, the data frame will be processed as a common data frame but a description thereof is omitted.

If it is determined that the received data frame is a group-addressed frame transmitted from the specific source, the source determination unit 204 outputs the group-addressed frame to an error determination unit 205. The error determination unit 205 determines whether or not the group-addressed frame has an error based on an FCS (Frame Check Sequence) of the group-addressed frame, for example. If no error is detected by the error determination unit 205, the group-addressed frame is directly output to a higher-layer forwarding frame buffer 209, where it is subjected to buffering such that the frame numbers is not changed with respect to the numerical order, and then is forwarded to a higher layer via a higher-layer signal processing unit 210.

If an error in the group-addressed frame is detected by the error determination unit 205, the error determination unit 205 outputs this group-addressed frame to a frame management unit 206. The frame management unit 206 records an identifier of the group-addressed frame such as a sequence number or a frame number, and stores the group-addressed frame in a frame buffer 207. The group-addressed frame stored in the frame buffer 207 is kept for a predetermined period of time until a group-addressed frame having the same source ID is input.

Then, if a group-addressed frame having the same source ID arrives at the reception device 200 from another transmission device 100, this group-addressed frame is input to the error determination unit 205 via the wireless input/output unit 201, the wireless access control unit 202, the wireless frame demodulation unit 203, and the source determination unit 204, as with the previous group-addressed frame. Here, if no error is detected by the error determination unit 205, this group-addressed frame is output to the higher-layer forwarding frame buffer 209 and the frame management unit 206 deletes the same group-addressed frame with the error stored in the frame buffer 207.

On the other hand, if it is determined by the error determination unit 205 that this group-addressed frame has an error, the frame management unit 206 determines whether or not any group-addressed frame having the same source ID as that of this group-addressed frame is stored in the frame buffer 207. If there is any group-addressed frame having the same source ID in the frame buffer 207, the frame management unit 206 inputs the sequentially received group-addressed frames having the same source ID to a frame combining unit 208 so that the error is solved by diversity combining processing or the like. When the error has been solved by the processing for combining the group-addressed frames having the same source ID, the error determination unit 205 outputs the resultant frame as an errorless group-addressed frame to the higher-layer forwarding frame buffer 209.

Note that if a plurality of flows (content items) are transmitted from one source, information for specifying each of the flows is added. In this case, a transmission device stores the information for specifying the flow in a field of the frame and transmits the frame, and a reception device identifies, based on both the source and the flow, the group-addressed frame that is to be received by the reception device itself and is to be subjected to diversity combining processing.

Figure 7:
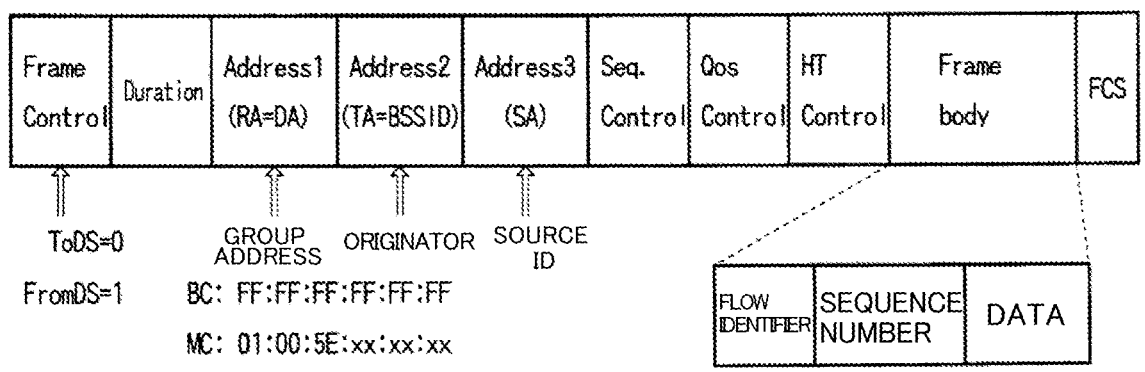
FIG. 7 is a diagram illustrating an example of a format of a wireless frame.
Figure 8:
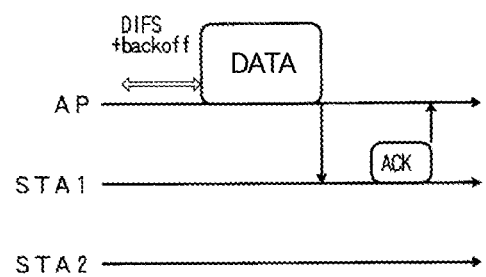
FIG. 8 is a diagram illustrating a data forwarding procedure of unicast data transmission.
Figure 9:
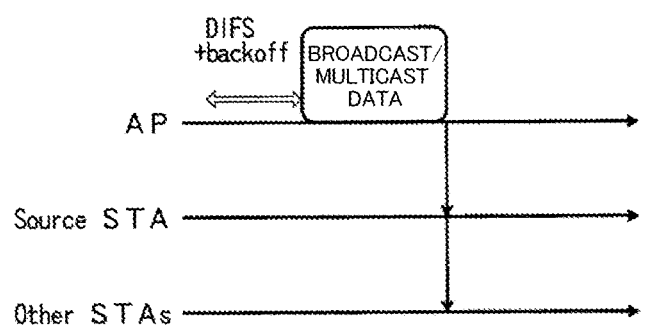
FIG. 9 is a diagram illustrating a procedure for transmitting group-addressed data (broadcast data/multicast data).

An example of a format of a wireless frame is shown in FIG. 7. In this example, a source ID (SA) is set in the Address 3 field, and a flow identifier (FID), a sequence number assigned for each pair of SA and FID, and data to be subjected to group-addressed transmission are set in the Frame Body field. The reception device determines whether or not a wireless frame belongs to the same group-addressed data based on SA, FID, and the sequence number thereof.

Note that the reception device 200 shown in FIG. 3 is assumed to be used in a case where the plurality of transmission devices 100 use a common wireless channel, but may have a configuration that corresponds to wireless channels used by the transmission devices. For example, the reception device 200 has a configuration such that the wireless input/output unit 201 to the source determination unit 204 are prepared so as to correspond to the wireless channels.

Embodiment 2

Figure 4:
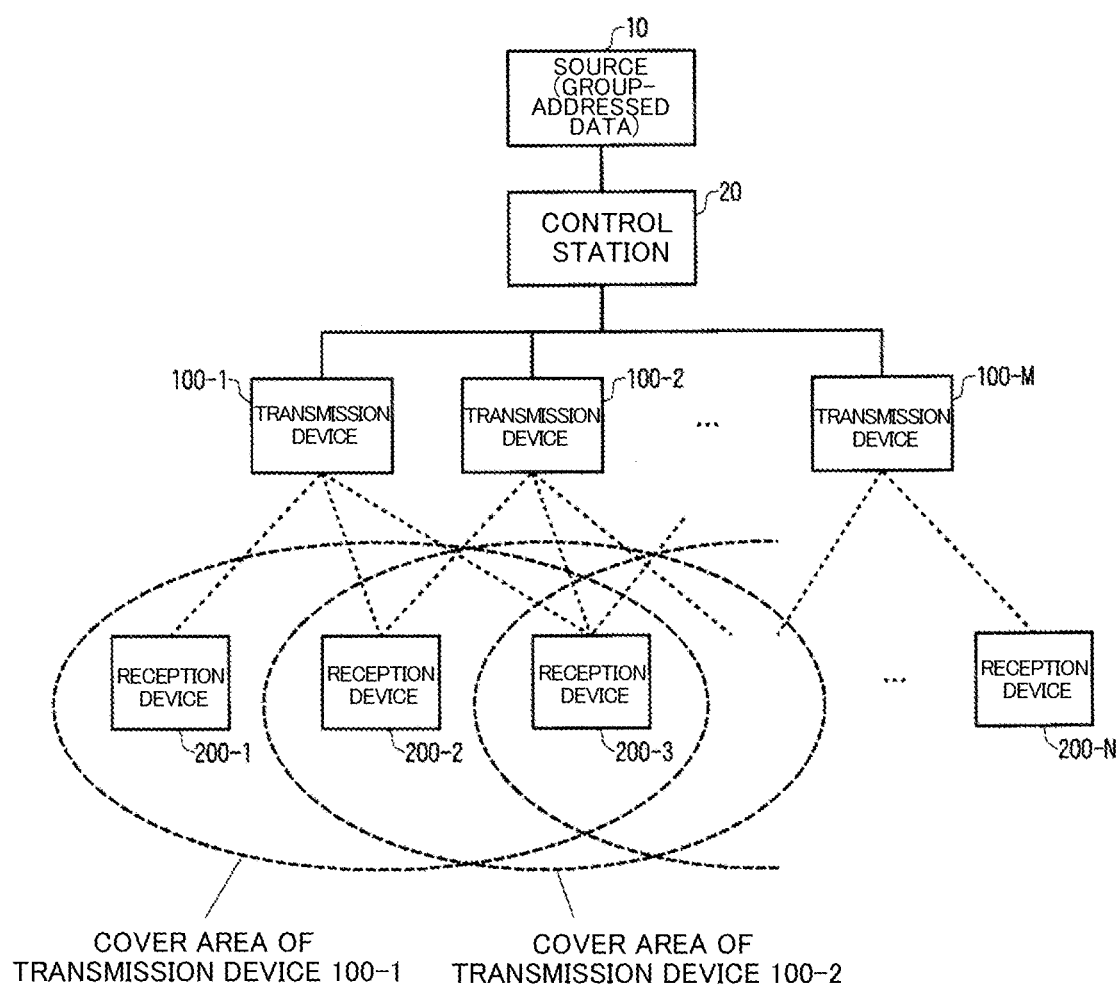
FIG. 4 is a diagram illustrating a configuration of Embodiment 2 of the wireless communication system of the present invention.

FIG. 4 shows a configuration of Embodiment 2 of the wireless communication system of the present invention. Here, cover areas of the respective transmission devices are shown.

In FIG. 4, the cover area of the transmission device 100-1 includes an area covered only by the transmission device 100-1, and the entire cover area of the transmission device 100-2 overlaps with the cover areas of other transmission devices. That is to say, when the same group-addressed frames are transmitted from a plurality of transmission devices, a reception device 200 within the cover area of the transmission device 100-2 inevitably receives the same group-addressed frame from another transmission device. Accordingly, the diversity combining effect can be expected within the cover area of the transmission device 100-2, and thus the transmission device 100-2 can use an MCS (modulation and coding scheme) that has high transmission efficiency. On the other hand, the cover area of the transmission device 100-1 includes the area that does not overlap with the cover area of another transmission device, and no diversity combining effect can be expected within this area. Therefore, the transmission device 100-1 needs to use an MCS that has high reception probability.

As described above, Embodiment 2 is characterized in that MCS control is performed in addition to the transmission and reception control in Embodiment 1. Therefore, the wireless communication system of Embodiment 2 includes a control station 20 that is arranged between the specific source 10 and the plurality of transmission devices 100-1 to 100-M, in addition to the configuration of the wireless communication system of Embodiment 1 shown in FIG. 1.

Some of the transmission devices 100-1 to 100-M that cooperate with each other to perform a group addressed service report RSSI and position information observed by them to the control station 20, and the control station 20 calculates the number of transmission devices whose transmissions can be received by the reception devices 200-1 to 200-N in the area. For example, the reception device 200-1 can receive transmissions only from a wireless device, that is, the transmission device 100-1, and the reception device 200-2 can receive transmissions from at least two wireless devices, namely, the transmission devices 100-1 and 100-2.

Thus, since in the cover area of the transmission device 100-1, there is the reception device that can only receive wireless frames from one transmission device, the transmission device 100-1 performs transmission at the lowest rate of MCS=0. On the other hand, all the reception devices within the cover area of the transmission device 100-2 can receive wireless frames from two or more transmission devices, and thus MCS=1 is set because it is determined that diversity combining can be executed to achieve a quality improvement to 3 dB or more. The control station 20 notifies each of the transmission devices of the set MCS. Each of the transmission devices transmits group-addressed frames with the notified MCS.

Embodiment 3

In Embodiment 3, a transmission timing is controlled between the transmission devices, thereby ensuring a chance of data combining processing being performed in the reception devices. That is to say, in order to perform processing for combining the same group-addressed frames received from a plurality of transmission devices, the time period between the reception of a first group-addressed frame and the reception of an n-th group-addressed frame (where n is a value that can be buffered in the reception device) needs to fall within a predetermined time period.

The wireless communication system according to Embodiment 3 has a configuration in which, as shown in FIG. 4, the control station 20 is arranged between the specific source 10 and the plurality of transmission devices 100-1 to 100-M.

In FIG. 4, the control station 20 receives an input of group-addressed data transmitted from the source 10, and calculates and controls the forwarding period of forwarding the group-addressed data to the transmission devices 100-1 to 100-M. Also, the control station 20 not only controls the forwarding of the group-addressed data but also calculates a period in which group-addressed frames are to be transmitted to a wireless medium in order to cause connected transmission devices to cooperate with each other, and notifies the transmission devices of the calculated period. Each of the transmission devices transmits the forwarded group-addressed data as the group-addressed frames to the wireless medium based on the notified transmission period. The wireless devices sequentially transmit the group-addressed frames, and a reception device receives the same group-addressed frames of a specific source from the plurality of transmission devices and combines them.

Figure 5:
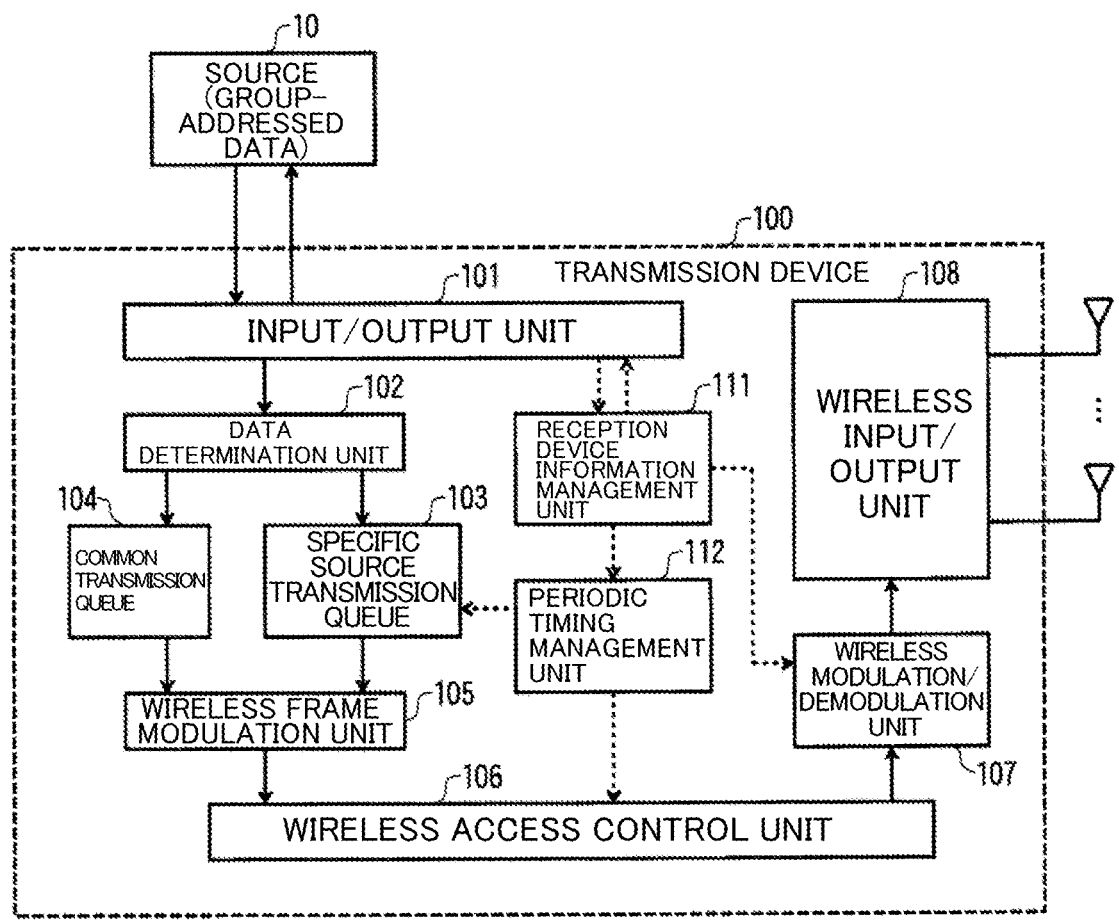
FIG. 5 is a diagram illustrating a configuration of the transmission device 100 that corresponds to Embodiment 2 and Embodiment 3.

FIG. 5 shows a configuration of the transmission device 100 that corresponds to Embodiment 2 and Embodiment 3.

In FIG. 5, the transmission device 100 of Embodiment 2 and Embodiment 3 is provided with a reception device information management unit 111 and a periodic timing management unit 112, in addition to the configuration of the transmission device 100 of Embodiment 1 shown in FIG. 2.

Upon being notified of information such as the MCS from the control station 20, the reception device information management unit 111 notifies the wireless modulation/demodulation unit 107 of this information. When the group-addressed data extracted from the specific source transmission queue 103 is transmitted to the wireless medium, the wireless modulation/demodulation unit 107 performs modulation using the MCS. The modulated wireless frame is transmitted from the wireless input/output unit 108 to the wireless medium.

The periodic timing management unit 112 performs management such that wireless access control starts for the wireless frame transmission at a timing at which the group-addressed data to be transmitted within the transmission period is extracted from the specific source transmission queue 103 and the transmission period starts.

Figure 6:
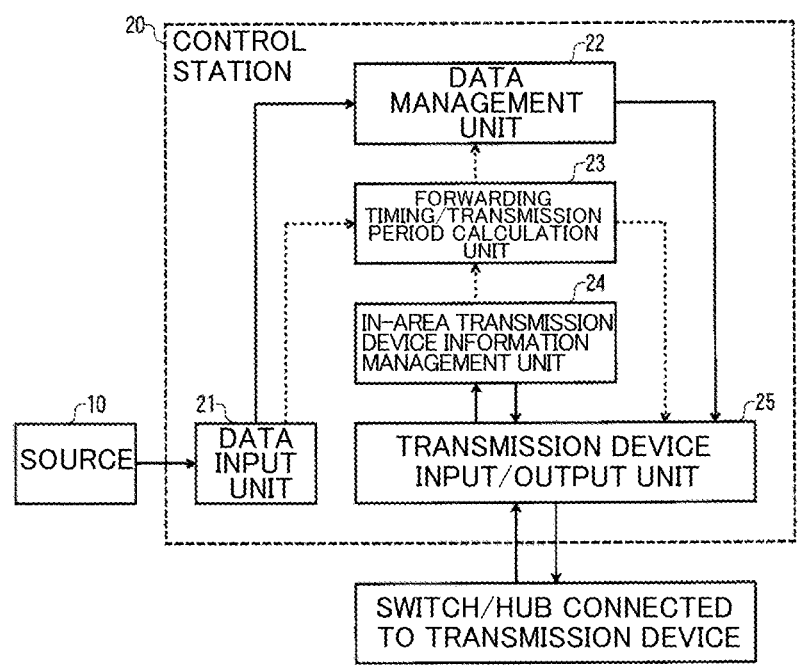
FIG. 6 is a diagram illustrating a configuration of a control station 20 that corresponds to Embodiment 2 and Embodiment 3.

FIG. 6 shows a configuration of the control station 20 that corresponds to Embodiment 2 and Embodiment 3.

In FIG. 6, the control station 20 receives the group-addressed data transmitted from the source 10 at a data input unit 21, and forwards the group-addressed data to a data management unit 22 that has a buffering function. The data management unit 22 manages the group-addressed data until the group-addressed data is forwarded to transmission devices that cooperate with each other. A transmission device input/output unit 25 receives an input of transmission device information and the like, and forwards, to an in-area transmission device information management unit 24, the number of transmission devices capable of performing transmission and the specifications of the transmission devices themselves, serving as information for determining the MCS. The in-area transmission device information management unit 24 outputs information necessary for calculation of the forwarding timing of the group-addressed data to a forwarding timing/transmission period calculation unit 23. The forwarding timing/transmission period calculation unit 23 calculates, based on the forwarded information, the timing at which the group-addressed data managed by the data management unit 22 is to be forwarded to the transmission devices, and notifies the data management unit 22 of the calculated timing.

Also, the forwarding timing/transmission period calculation unit 23 calculates the period at which each transmission device transmits wireless frames, and notifies the transmission device of the calculated period via the transmission device input/output unit 25. Note that if the data buffer of each of the transmission devices is sufficiently large or the frequency of transmission of the wireless frames is higher than the frequency of transmission of the group-addressed data from the source 10, the data management unit 22 or calculation of data forwarding timing may be omitted.

REFERENCE SIGNS LIST

10 Source
20 Control station
21 Data input unit
22 Data management unit
23 Forwarding timing/transmission period calculation unit
24 In-area transmission device information management unit
25 Transmission device input/output unit
100 Transmission device
101 Input/output unit
102 Data determination unit
103 Specific source transmission queue
104 Common transmission queue
105 Wireless frame modulation unit
106 Wireless access control unit
107 Wireless modulation/demodulation unit
108 Wireless input/output unit
111 Reception device information management unit
112 Periodic timing management unit
200 Reception device
201 Wireless input/output unit
202 Wireless access control unit
203 Wireless frame demodulation unit
204 Source determination unit
205 Error determination unit
206 Frame management unit
207 Frame buffer
208 Frame combining unit
209 Higher-layer forwarding frame buffer
210 Higher-layer signal processing unit

The invention claimed is:

1. A wireless communication system comprising:
a plurality of transmission devices, each transmission device is configured to receive an input of group-addressed data transmitted from a specific source, converts the group-addressed data into wireless frames, add a predetermined source identifier unique to each piece of group-addressed data to the wireless frames, and perform group-addressed transmission of the wireless frames; and
a reception device configured to receive the wireless frames transmitted from the plurality of transmission devices and determines whether a given wireless frame has same source identifier as another wireless frame received from a different transmission device
wherein the reception device further determines whether an error is detected in the given wireless frame, and diversity combines the given wireless frame with the another wireless frame in response to detecting an error in the given wireless frame and a determination that that another wireless frame having the same source identifier has been received from a different transmission device, and deletes the given wireless frame in response to not detecting an error in the given wireless frame and a determination that that another wireless frame having the same source identifier has been received from a different transmission device.

2. The wireless communication system according to claim 1, wherein the predetermined source identifier includes an identifier that indicates the specific source, and an identifier that indicates each of flows transmitted from the specific source.

3. A wireless communication method, comprising:
receiving, by a plurality of transmission devices, group-addressed data transmitted from a specific source;
converting, by the plurality of transmission devices, the group-address data in wireless frames, adding a predetermined source identifier unique to each piece of group-addressed data to the wireless frames, and performing group-addressed transmission of the wireless frames;
receiving, by a reception device, the wireless frames transmitted from the plurality of transmission devices;
determining, by the reception device, whether a given wireless frame has same source identifier as another wireless frame received from a different transmission device in the plurality of transmission devices;
determining, by the reception device, whether an error is detected in the given wireless frame;
diversity combining, by the reception device, the given wireless frame with the another wireless frame in response to detecting an error in the given wireless frame and a determination that that another wireless frame having the same source identifier has been received from a different transmission device; and
deleting, by the reception device, the given wireless frame in response to not detecting an error in the given wireless frame and a determination that that another wireless frame having the same source identifier has been received from a different transmission device.

4. The wireless communication method according to claim 3, wherein the predetermined source identifier includes an identifier that indicates the specific source, and an identifier that includes each of flows transmitted from the specific source.

5. A wireless communication method, comprising:
receiving, by a plurality of transmission devices, group-addressed data transmitted from a specific source;
converting, by the plurality of transmission devices, the group-address data in wireless frames, adding a predetermined source identifier unique to each piece of group-addressed data to the wireless frames, and performing group-addressed transmission of the wireless frames;
receiving, by a reception device, the wireless frames transmitted from the plurality of transmission devices;
determining, by the reception device, whether a given wireless frame has same source identifier as another wireless frame received from a different transmission device in the plurality of transmission devices;
determining, by the reception device, whether an error is detected in the given wireless frame;
buffering, by the reception device, the given wireless frame in a buffer in response to detecting an error in the given wireless frame and a determination that another wireless frame having the same source identifier has not been received from a different transmission device;
forwarding, by the reception device, the given wireless frame for subsequent processing in response to not detecting an error in the given wireless frame and a determination that another wireless frame having the same source identifier has not been received from a different transmission device
diversity combining, by the reception device, the given wireless frame with the another wireless frame in response to detecting an error in the given wireless frame and a determination that that another wireless frame having the same source identifier has been received from a different transmission device; and
deleting, by the reception device, the given wireless frame in response to not detecting an error in the given wireless frame and a determination that that another wireless frame having the same source identifier has been received from a different transmission device.

* * * * *